Sept. 18, 1956
I. JEPSON
2,763,762
ELECTRIC DEHORNER AND MEANS FOR CONVERTING
SAME TO SOLDERING IRON
Filed March 19, 1952
4 Sheets-Sheet 1
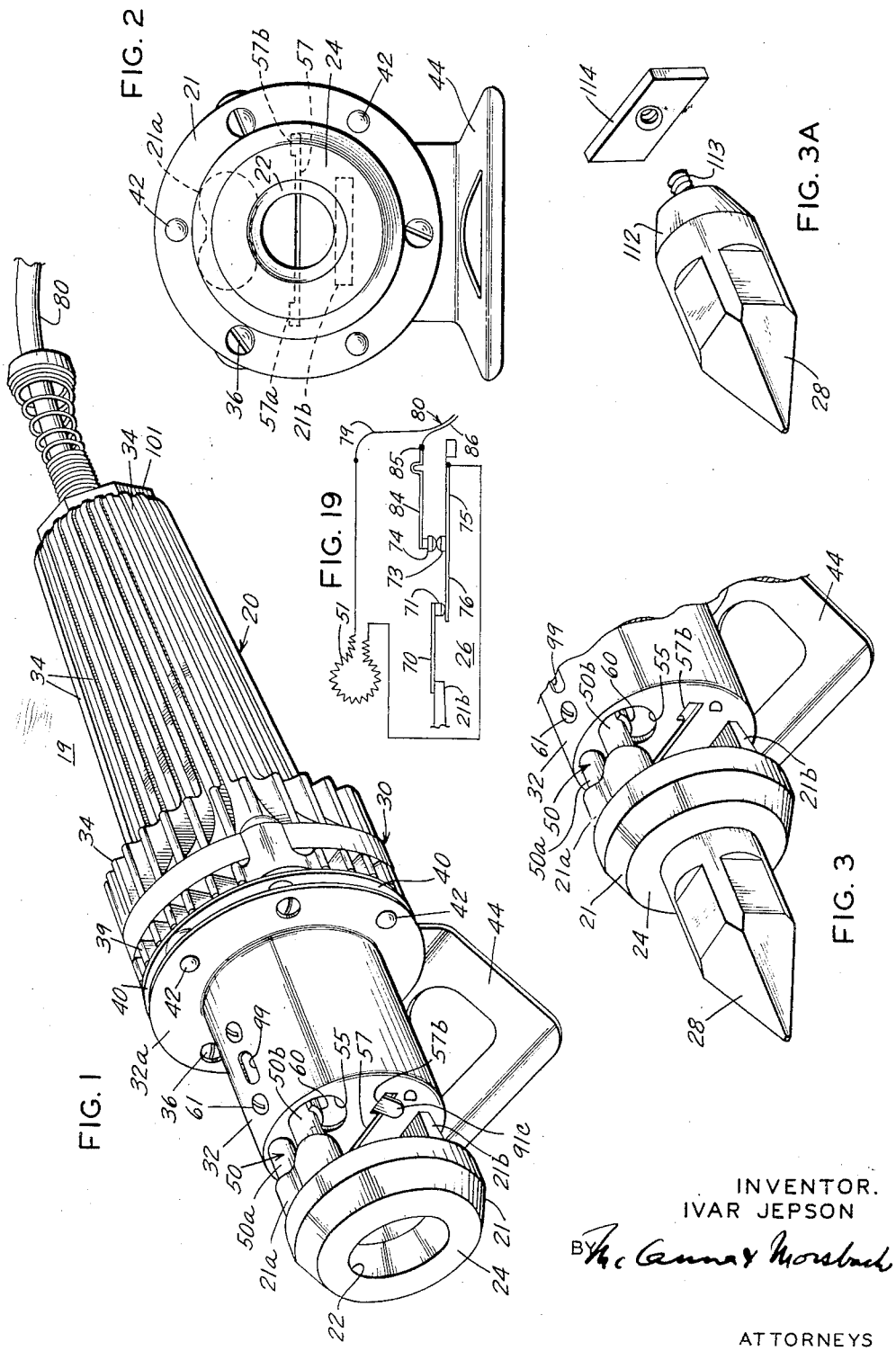
INVENTOR.
IVAR JEPSON
BY McCanna & Morsbach
ATTORNEYS Sept. 18, 1956  I. JEPSON  2,763,762
ELECTRIC DEHORNER AND MEANS FOR CONVERTING
SAME TO SOLDERING IRON
Filed March 19, 1952  4 Sheets-Sheet 2

INVENTOR.
IVAR JEPSON
BY McCanna & Morsbach
ATTORNEYS

Sept. 18, 1956            I. JEPSON             2,763,762
ELECTRIC DEHORNER AND MEANS FOR CONVERTING SAME TO SOLDERING IRON
Filed March 19, 1952                        4 Sheets—Sheet 3
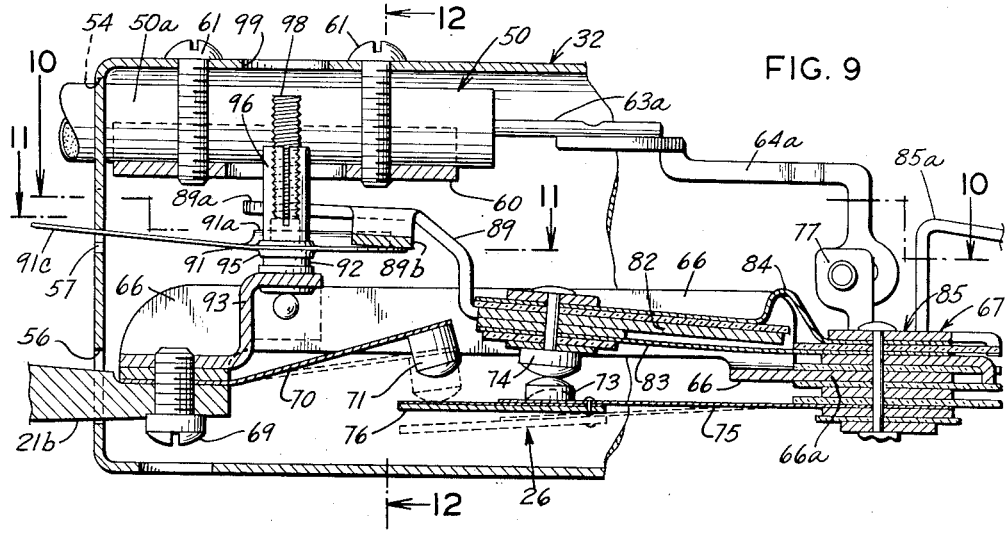
FIG. 9
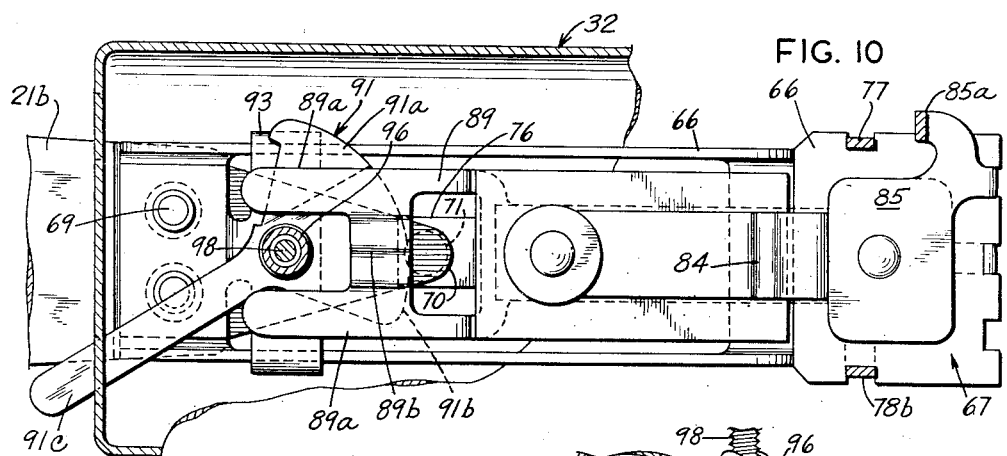
FIG. 10
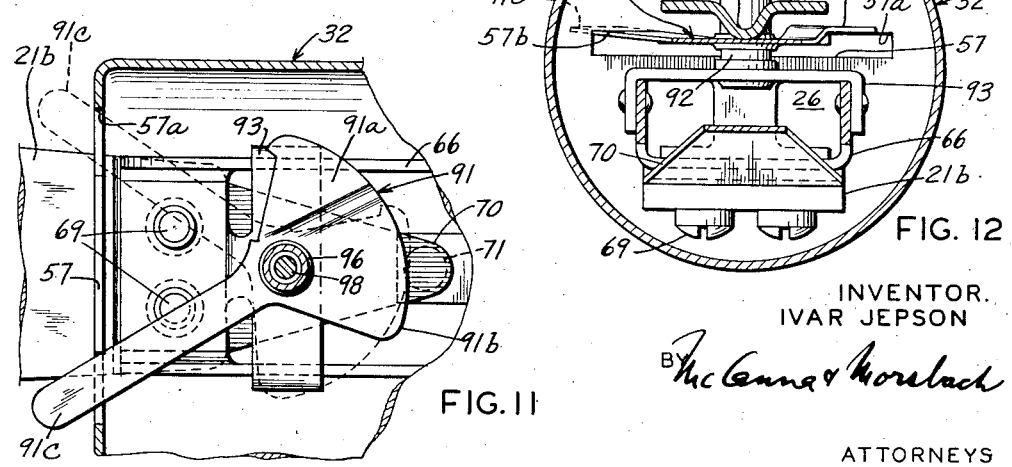
FIG. 12
FIG. 11
INVENTOR.
IVAR JEPSON
BY McCanna & Morsbach
ATTORNEYS Sept. 18, 1956   I. JEPSON   2,763,762
ELECTRIC DEHORNER AND MEANS FOR CONVERTING
SAME TO SOLDERING IRON
Filed March 19, 1952   4 Sheets-Sheet 4

INVENTOR.
IVAR JEPSON
BY McKenna & Morshead
ATTORNEYS the loss of blood, an open wound, the danger of infection, shock to the animal, and the like.

In order to overcome the shortcomings of the above-mentioned methods and apparatus for dehorning, prior devices using heat have been employed for dehorning young animals, but such prior art devices have not been completely successful in efficiently removing horns. Some of these prior art devices utilize a heated member having a substantially hemispherical recess formed therein which is applied to the horn bud or button. These devices are inadequate inasmuch as the shallow hemispherical recesses do not permit the use of the instrument on older animals whose horn buttons often become comparatively large in diameter and length. Furthermore, the tips of these earlier devices were formed with a comparatively thin or narrow edge in engagement with the horn cells of the animal adjacent to or surrounding the horn button. This configuration of the heated tip was not satisfactory to perform and carry out the application of cell destroying heat throughout the area immediately surrounding the horn. This is because the horn producing cells extend in a ring around the base of the horn over an area from one-quarter to one-half of an inch in width. The prior devices have been heated by gas or electricity, but the source of heat has not been regulated so that it has been impractical to apply an even heat of constant high temperature to the area surrounding the horn button, thereby to completely destroy the horn cells. It would be desirable therefore to provide an electric dehorner having automatic heat control with improved means for insuring destruction of the horn-producing cells in substantially every application thereof and wherein the dehorning unit may readily be converted to a heavy-duty soldering iron when desired.

Accordingly, it is an object of the present invention to provide a unitary, electrically operated dehorning instrument which is capable of easy manual operation to produce a dehorned animal which will not result in either shock to the animal or deleterious open wounds.

Another object resides in the provision of an annular heating member which is open at both ends so that horns of animals up to four months in age may easily be removed.

A further object of the present invention is to provide an annular heating member of a configuration with a large surface area disposed in contact with the hide of the animal surrounding the horn button.

Still another object of the present invention resides in the provision of a horn removing instrument which is electrically heated under the control of a temperature responsive means to provide an even flow of heat to the hide and horn of the animal at a constant predetermined temperature sufficient to destroy all of the horn producing cells.

An additional object of the present invention involves the provision of an electrically operated horn removing device which is convertible to a soldering iron with a minor change so as to obviate a capital expenditure for two separate instruments which are not normally simultaneously employed.

Further objects and advantages of the present invention will become apparent as the following description proceeds and the features of novelty which characterize the invention will be pointed out with particularity in the claims annexed to and forming a part of this specification.

In accordance with these and many other objects, one embodiment of the invention comprises a substantially cylindrical housing member at one end of which is secured an annular heating member. A depending portion of the heating member extends into the housing and a bimetallic element is secured to the end of this depend-

United States Patent Office 2,763,762
Patented Sept. 18, 1956

2,763,762

ELECTRIC DEHORNER AND MEANS FOR CONVERTING SAME TO SOLDERING IRON

Ivar Jepson, Oak Park, Ill., assignor to Sunbeam Corporation, Chicago, Ill., a corporation of Illinois Application March 19, 1952, Serial No. 277,363

13 Claims. (Cl. 219—29)

This invention relates to an electric heating unit and more particularly to an electric heating unit specifically adapted for dehorning calves or the young of other horn-producing animals which dehorner is readily convertible for use as a soldering iron.

Many animals, such as cattle, goats and sheep, grow horns which are a sort of bony appendage attached to and protruding from the skulls of these animals. These animals are provided at birth or shortly thereafter with specific horn producing cells located where horns will later develop. Also at birth calves normally have what are referred to as horn buds or buttons, quite unnoticeable, and often completely enclosed within the skin. The horn producing cells are located around the base of these buds or buttons. Moreover, such buttons are usually unattached when the animal is very young, and a variable period of the order of four months after birth, depending upon the animal, is required before the horns become attached. When they do, the horns grow in the conventional manner.

It is pretty well established that except from the standpoint of appearance, horns have no beneficial value although they may have served as a defense mechanism when cattle were wild. However, horned cattle are destructive in that they tend to injure other cattle, they are harder to handle, the horns themselves are dangerous to humans, and it is well established that milk production is decreased substantially among cattle having horns, and also losses due to horn bruises reduce the income which may be obtained from beef producing cattle. For the above reasons, it is well established that dehorning of cattle is desirable.

There have been numerous methods of dehorning, perhaps the most common of which has been sawing or cutting the horns after the animal is grown. This is a difficult task, producing a severe shock to the animal, with a great deal of loss of blood, and the danger of infection. Moreover, this method is not satisfactory except in adult animals since if the horns of young animals are cut, they will continue to grow. Also until the animal reaches adulthood much damage can be done by its horns.

Other methods of dehorning are primarily directed to destroying the horns while the animals are very young; in other words, when cattle are calves. Various dehorning pastes, commonly referred to as caustics, have been used in which it is necessary to clip the hair from around the horn button and apply the caustic. This method of dehorning is unsatisfactory due to the fact that the pain is severe, there is always the possibility of the caustic engaging other parts of the animal's body, particularly the eyes, also other animals licking the parts to which the caustic is applied may even be poisoned. This caustic has been known to rub off on the calf's mother, resulting in severe burns to the mother. Other methods of dehorning have involved the use of a gouge, scoop, or the like, to remove the horn button. They require very skillful operators in the first place, and they result in ing portion in heat conductive relationship. The free end of the bimetallic or temperature responsive element is adapted to engage a circuit opening and closing element which is in series with the energizing circuit of the heating member so that the temperature responsive element makes and breaks the energizing circuit in accordance with the temperature of the heating member. The annular heating member is provided with a tapered aperture therein which is adapted to receive a detachably mounted tip which is utilized to convert the dehorning apparatus to a soldering iron of general utility.

For a better understanding of the present invention reference must be had to the accompanying drawings in which:

Fig. 1 is a perspective view of a dehorning device embodying the invention shown with the device set for a dehorning operation;

Fig. 2 is an end elevational view of the device shown in Fig. 1;

Fig. 3 is a fragmentary perspective view of the dehorning device including a tip for adapting the device for use as a soldering iron with the device set for a soldering operation;

Fig. 3A is an exploded perspective view of the soldering iron tip and meanas for securing it to the dehorning device;

Fig. 4 shows the complete structure;

Fig. 9 is an enlarged fragmentary sectional view showing the control mechanism of Fig. 4 in the position of Fig. 1 for controlling the heat in a dehorning operation;

Fig. 10 is a sectional view taken along line 10—10 of Fig. 9 assuming that Fig. 9 shows the complete structure;

Fig. 11 is a sectional view taken along line 11—11 of Fig. 9 assuming that Fig. 9 shows the complete structure and showing both setting positions;

Fig. 12 is a sectional view taken along line 12—12 of Fig. 9 assuming that Fig. 9 shows the complete structure;

Fig. 4 shows the complete structure;

Fig. 15 shows the complete structure;

Fig. 15 shows the complete structure;

Fig. 19 is a schematic circuit diagram of the heating unit.

Figure 4:
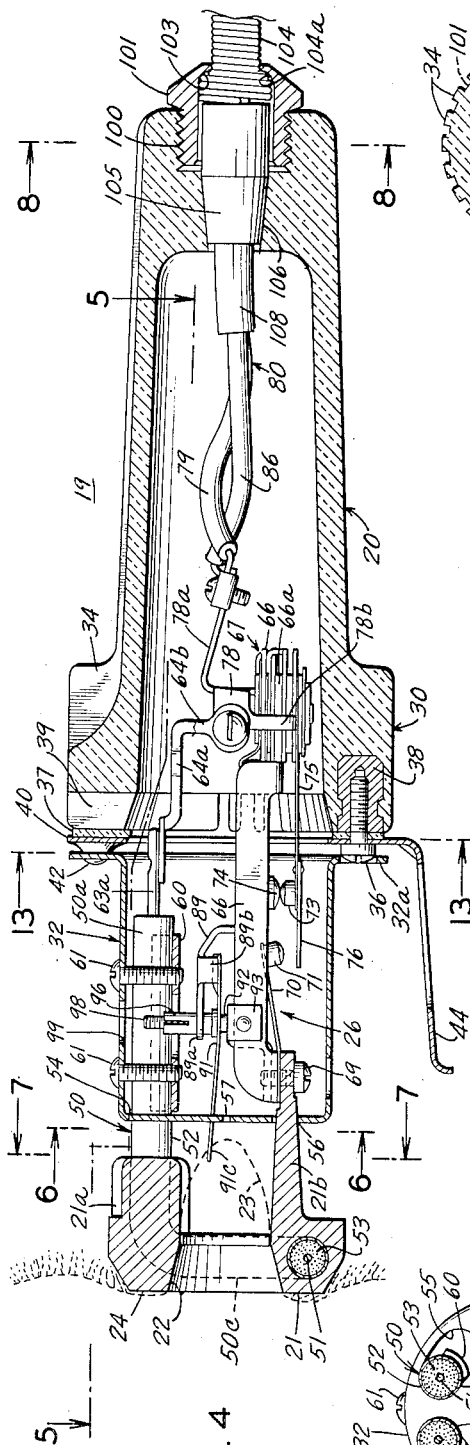
Fig. 4 is a longitudinal cross sectional view taken centrally of the device shown in Fig. 1.
Figure 8:
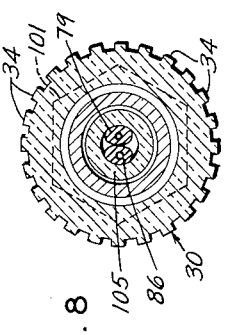
Fig. 8 is a cross sectional view taken along line 8—8 of Fig. 4 making the same assumption as above.

Referring now to the drawings wherein like reference numerals indicate the same elements throughout the several views and, more particularly, to Figs. 1 and 4 of the drawings, the dehorning instrument 19 of the present invention comprises a housing member indicated generally as 20 to which an annular heating member or dehorning ring 21 is secured. The annular heating member 21 has a tapered aperture 22 formed therein which is adapted to receive a horn button or bud shown in dotted outline at 23 in Fig. 4. This dehorning ring 21, which is effectively of toroidal shape, is provided with an annular searing surface 24 which is of an enlarged size so that heat is transmitted to the horn cells over a considerable area surrounding the base of the horn button 23. Preferably the dehorning ring 21 is formed of an aluminum bronze alloy which has a high heat conductivity and resists scaling under high temperature. In a commercial embodiment built in accordance with the present invention an annular searing surface having a width of between one quarter and one half inch was employed. The temperature of the dehorning ring 21 as is described hereinafter is regulated by a thermostatic control unit indicated generally at 26 (Fig. 4). By the provision of the thermostatic control unit 26, it is possible to maintain the heating member 21 at a high uniform temperature such as 1,000° F. in order to completely destroy the horn producing cells disposed adjacent the horn member 23. The temperature control device 26 positively prevents the formation of abnormal horn growths commonly known as "scurs" which are caused by incomplete and inadequate destruction of the ring of horn cells surrounding the horn button or bud 23.

In accordance with the present invention the dehorning unit 19 is easily converted into a heavy duty soldering iron by merely attaching a soldering tip 28 (Fig. 3) into position in the tapered aperture 22 which is provided in the annular heating member or dehorning ring 21. The tip 28 is maintained in good heat conducting relationship with the ring 21 to insure proper heating thereof. Since it is undesirable to utilize a soldering iron having a temperature in the range which is necessary to destroy the horn cells, the thermostatic control unit 26 is provided with manual control means described hereinafter which may be adjusted to reduce the controlled temperature to a desirable value for soldering purposes.

Figure 13:
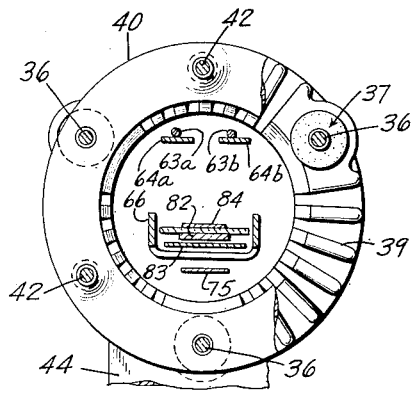
Fig. 13 is a fragmentary cross sectional view taken along line 13—13 of Fig. 4 assuming
Figure 14:
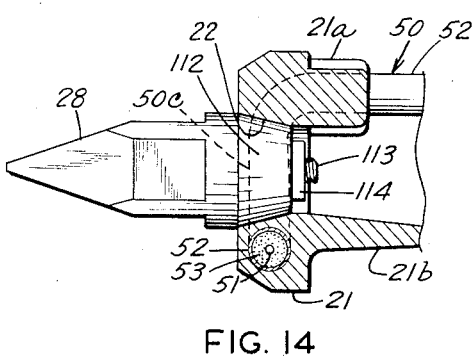
Fig. 14 is a fragmentary sectional view of the soldering iron tip in position in the annular heating member.

Considering first the housing 20 of the dehorner, it includes a dielectric handle portion 30 and a metallic housing section 32. The housing section 30 defining the handle is preferably formed of Bakelite with a plurality of integral radially spaced longitudinally extending ribs or corrugations 34 which serve to radiate the heat produced within the interior of the housing member 20 and accordingly prevent overheating of the handle portion 30. The handle portion 30 is provided with an enlarged end adjacent the housing section 32 to protect the operator's hand from the hot metal portion of the housing when grasping handle portion 30. The metallic housing section 32 is of cup shaped configuration having a lateral flange 32a at the open end thereof, which flange is secured to the member 30 indirectly by a plurality of machine bolts 36 (Figs. 1, 2, 4, 5 and 13) which are threadedly received within metal inserts 38 molded within an end portion of the member 30. Thus the portions 30 and 32 define a unitary housing. A heat insulating washer 37 of asbestos or the like is positioned on each of the bolts 36 adjacent the inserts 38 to prevent conduction of heat from the metallic housing 32 to the molded housing 30. The end of housing 30 is provided with a plurality of radially extending ribs 39 (Fig. 13) which define radial passageways between the two housing sections leading to the interior of housing 20 to facilitate the circulation of air through the housing 20.

A desirable feature of the present invention resides in a built in stand for the dehorner or soldering iron to rest on when not in use. This built in stand comprises an annular ring 40 which is riveted as by rivets 42 to the flange 32a of the housing 32. The heads of the machine bolts 36 engage the ring 40 and accordingly secure the ring 40 and section 32 to the section 30. The ring 40 is provided with a depending flange 44 which projects at right angles to the ring 40 to provide the stand for supporting the dehorning instrument 19 in position on a table or other flat supporting surface. A suitable clearance between the body of the housing member 32 and the ring 40 is provided by virtue of shoulders provided on the rivets 42 thus additionally aiding in providing a passageway into housing 20 for the circulation of air through the housing 20. With the above described arrangement the ribbed housing portion 30 remains comfortably cool to the bare hand even when the unit 19 is in continuous use.

Figure 6:
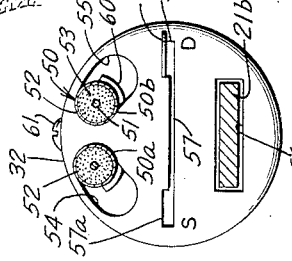
Fig. 6 is a cross sectional view taken along line 6—6 of Fig. 4 again assuming

Considering next the manner in which the dehorning ring 21 is heated to the high temperatures referred to above and, moreover, considering how it is supported in the housing 20, attention is directed particularly to Figs. 4, 6 and 10 of the drawings. To heat dehorning ring 21 there is provided an electric heating element 50 which preferably is of the sheathed type. Such types of heating elements are well-known and generally comprise a helical resistance conductor 51 centrally disposed within an outer metallic sheath 52 and supported in spaced relationship with reference to the sheath by an insulating heat conducting mass 53 formed of a suitable material such as highly compressed magnesium oxide. This latter material has been found to provide the desired insulation and at the same time to have sufficiently good heat conducting properties so as not to delay the transfer of heat from the coiled resistor element 51 disposed centrally of the sheath to the sheath 52 and thence to any device such as the dehorning ring 21 which it is desired to heat. As illustrated in the drawings, the sheathed heating element 50 is bent in the form of a hairpin with the two ends 50a and 50b extending in closely spaced parallel relationship. The bight portion of the U-shaped or hairpin shaped sheathed heating element 50 is bent laterally from the leg portions 50a and 50b to form a circular portion 50c. The circular portion 50c of the sheathed heating element 50 is cast within the dehorning ring 21 as best shown in Fig. 4 of the drawings so that the dehorning ring 21 may be rapidly heated when the conductor 51 of the sheathed heating element 50 is energized. As illustrated, the dehorning ring 21 is provided with two integral projections 21a and 21b, respectively. The projection 21a encloses a short portion of the legs 50a and 50b of the sheathed heating element 50, while the projection 21b which extends laterally from the ring 21 parallel to the legs 50a and 50b and provides a suitable support for the thermostatic control unit or thermal responsive device 26 described in greater detail hereinafter.

Figure 7:
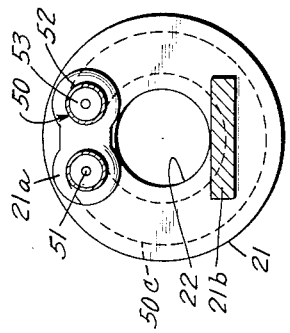
Fig. 7 is a cross sectional view taken along line 7—7 of Fig. 4 making the same assumption as above.
Figure 5:
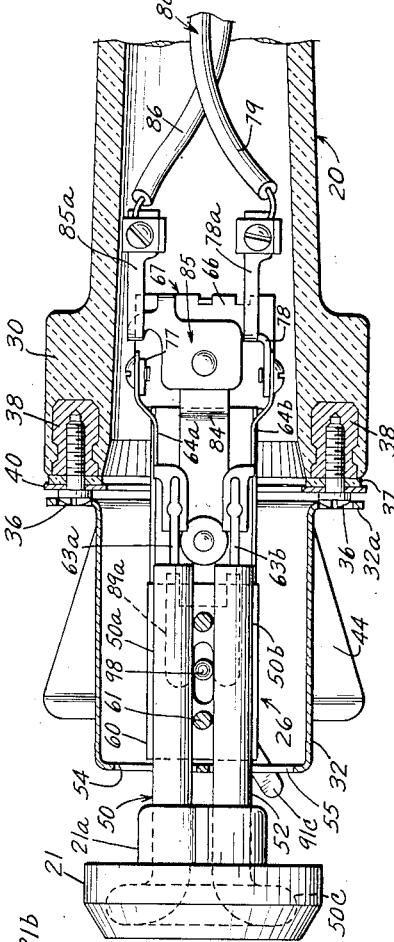
Fig. 5 is a sectional view taken along line 5—5 of Fig. 4 assuming that Fig. 4 shows the complete structure.

In order to support the dehorning ring 21 and the associated sheathed heating element 50 as a part of the housing 20, the closed end of the housing section 32 is provided with a plurality of openings 54, 55, 56 and 57. The openings 54 and 55 receive the legs 50a and 50b, respectively, while the opening 56 receives the projection 21b. This opening 56 is an elongated slot to accommodate the projection 21b which is a relatively wide flat member best shown in Figs. 6 and 7 of the drawings. The opening 57 is provided as an elongated slot to accommodate a control element described in detail hereinafter. With the projection 21b and the legs 50a and 50b extending into the housing section 32 through the openings 57, 54 and 55, respectively, the unit comprising the sheathed heating element 50 and the dehorning ring 21 may be supported or attached to the housing section 32 in any suitable manner. As illustrated in Figs. 4 and 9 of the drawings, a suitable clamping plate 60 of somewhat arcuate configuration clamps the legs 50a and 50b to the inside wall of the housing section 32 as by suitable screws or fastening means 61 extending through the wall of housing section 32.

When fastened in the manner described above, it will be apparent that the dehorning ring 21 and sheathed heating element 50 are supported as an integral part of the housing 20 so that when the housing is manually grasped by the handle portion 30 the dehorning ring 21 may be manipulated in any suitable manner. The ends of the conductor 51 are connected to terminals 63a and 63b, respectively, which are spaced from the housing section 32 and from each other so that no insulating problem is involved. Preferably L-shaped conductors of rigid material 64a and 64b are soldered or otherwise secured to the terminals 63a and 63b, respectively. These conductors preferably terminate in a loop terminal for ready connection to the thermostatic control unit 26 described in detail hereinafter.

Figure 16:
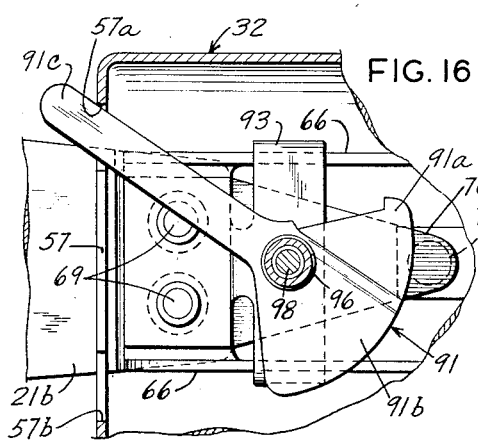
Fig. 16 is a cross sectional view taken along line 16—16 of Fig. 15 assuming
Figure 17:
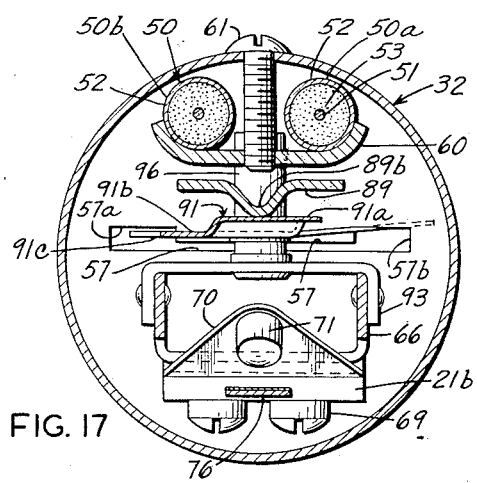
Fig. 17 is a cross sectional view taken along line 17—17 of Fig. 15 assuming

The thermostatic control unit or thermal responsive device 26 may comprise any suitable mechanism and is specifically illustrated as comprising a thermostatic control unit in the form of a unitary assembly quite similar to that disclosed in co-pending Jepson application Serial Number 192,671, filed October 28, 1950, and assigned to the same assignee as present application. As illustrated the thermal responsive control device 26 comprises a subassembly mounted on a suitable frame member 66 of somewhat channel shaped configuration including a rearwardly disposed and integral extension 66a (Fig. 9) which supports a stack generally indicated at 67 of conductors and interspersed insulating members. The forward end of the frame member 66 and consequently the entire subassembly is supported from the portion of the projection 21b extending into the housing section 32 as by suitable fastening means 69, whereupon the channel shaped frame member 66 extends in somewhat parallel relationship to the legs 50a and 50b of the sheathed heating element as is clearly apparent from Fig. 4 of the drawings. The fastening means 69 extend through suitable openings defined in the projection 21b and engage threaded openings in the frame member 66. These fastening means or screws 69 also clamp a bimetallic element 70 forming a part of the thermal responsive control device 26 into position in good heat conducting relationship with the projection 21b and consequently in good heat conducting relationship with the dehorning ring 21, since it will be remembered that the dehorning ring 21 and the projection 21b are cast as an integral element from very good heat conducting material such as aluminum bronze. Preferably the bimetallic element 70 has a somewhat triangular configuration as best shown in Figs. 12, 16 and 17 of the drawings. It will be apparent that with this construction the bimetallic element 70 is mounted as a cantilever and the free end thereof tends to deflect in response to temperature changes of the projection 21b. In the particular embodiment disclosed the bimetallic element 70 is provided at its free end with an insulated button or extension 71 which is adapted to be moved downwardly as viewed in Fig. 4 of the drawings in response to an increase in temperature of the projection 21b and hence the dehorning ring 21. Preferably the central web portion of the channel shaped frame 66 is cut away to provide free space for movement of the bimetallic element 70 and associated parts to be described hereinafter.

The thermal responsive device 26 also includes a thermally operated control switch comprising relatively movable contacts 73 and 74. The contact 73 which may be designated as the movable contact is mounted on a resilient contact arm 75 having one end disposed in the insulating stack 67. The inherent resilience of the resilient contact arm 75 tends to bias movable contact 73 toward conducting engagement with the contact 74 which may be designated the stationary contact.

In order to cause movement of the movable contact 73, resilient contact arm 75 is provided with an extension 76 engageable by the insulating projection 71 of bimetallic element 70. Preferably extension 76 comprises a compensating thermostat and is therefore formed of bimetallic material which as the ambient temperature within the housing section 32 increases tends to change the effective operation of the bimetallic element 70 in a well understood manner. The resilient contact arm 75 and consequently the movable contact 73 is electrically connected to an L-shaped conducting member 77 which in turn is connected with the conductor 64a and hence the terminal 63a of the sheathed heating element 50. The other terminal 63b of the sheathed heating element 50 is connected by conductor 64b to a conductor 78 having a portion 78a arranged for direct connection with one conductor 79 of a suitable power cord 80 and also an extension 78b which is interposed in the insulating stack 67 in order rigidly to support the terminal 78 and particularly the extension 78a thereof.

For the purpose of supporting the stationary contact 74 there is provided a contact supporting arm 82 which is somewhat pivotally supported by virtue of its attachment to a resilient contact arm 83 having its end remote from the contact 74 disposed within the insulating stack 67. The contact 74 is supported in insulating relationship with the contact supporting arm 82 and an electrical conductor in the form of a flexible strip 84 electrically connects contact 74 with an L-shaped terminal member 85 having terminal portion 85a electrically connected to the other conductor 86 of the power cord 80.

The contact 74 has been generally referred to as a stationary contact but as will become apparent from the following description it is selectively movable to provide two different settings of temperature control at the will of the operator. As was pointed out above, applicant's heating unit is designed primarily as a dehorning device but also may be converted to a soldering iron. Since entirely different temperatures are desired when the device is operated as a dehorning unit as compared to when it is operated as a soldering iron, means are provided to control the effective positions of stationary contact 74 to afford two different temperature settings for the heating unit 19. As illustrated the contact support 82 for the stationary contact 74 is provided with a curved extension 89 integrally formed at the end thereof and terminating in a forked portion 89a best shown in Figs. 9 and 10 of the drawings. At the point where the bifurcations defining the forked portions 89a begin the curved extension 89 is provided with a deformed somewhat U-shaped projection or cam follower 89b which extends downwardly as viewed in Fig. 9 of the drawings. It will be apparent that the farther down stationary contact 74 is positioned as viewed in Fig. 9 of the drawings the greater the deflection of bimetallic element 70 required to separate contacts 73 and 74 and hence interrupt the heating circuit, while the higher up stationary contact 74 is moved with reference to Fig. 9, the less the deflection required for bimetallic element 70 to interrupt the circuit at contacts 73 and 74. Obviously then the high temperature setting of the heating unit 19 is when the stationary contact 74 is in its lowermost position, shown best in Fig. 12, while its low temperature setting is as best shown in Fig. 17.

To provide two different settings of the stationary contact 74 the cam follower 89b is adapted to engage a somewhat segmental cam 91 pivotally mounted on a vertical stud 92 supported by suitable means 93 from the channel shaped frame 66 adjacent the end thereof attached to the projection 21b. The segmental cam 91 comprises a sheet metal member of segmental shape disposed to move in a horizontal plane when the heating unit is in the position shown in Fig. 4 of the drawings. The segmental portion includes two levels specifically designated by reference numerals 91a and 91b, the reference numeral 91a denoting the higher level thereof, best shown in Figs. 12 and 17 of the drawings, and the numeral 91b denoting the lower level thereof. The segmental cam includes an elongated lever member 91c as an integral part thereof, which lever member is adapted to extend through the elongated slot 57 at the closed end of the housing section 32 described above so that it is readily accessible to the operator from the exterior of the housing. Preferably the end wall of the housing 32 adjacent the ends of the slot 57 is provided with suitable indicia such as the letter S and the letter D to denote a setting for soldering as well as a setting for dehorning.

Figure 15:
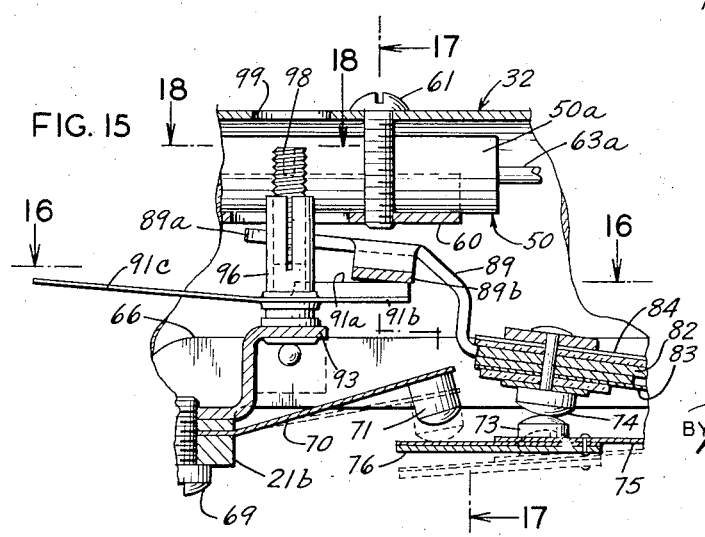
Fig. 15 is an enlarged fragmentary cross sectional view of the control mechanism shown in Fig. 4 in which the mechanism is adjusted to a position for controlling the application of heat during a soldering operation.

This is clearly shown in Fig. 6 of the drawings. As illustrated there, the slot 57 is provided with enlargements 57a and 57b at either end thereof and the inherent resilience of the lever 91c will tend to bias the lever 91c upwardly into the enlargements 57a or 57b when moved therein so that when the device is set for dehorning it will so remain until positively changed by the operator and vice versa. The levels of the segmental cam are so arranged that when the device is set for dehorning operation as shown in Fig. 12 the stationary contact 74 is moved toward movable contact 73 and the cam follower 89b engages portion 91b of cam 91. On the other hand, when the lever 91c is moved into the enlargement 57a of the slot 57 as shown by dotted lines in Fig. 11 of the drawings the stationary contact is moved away from movable contact 73 to the position shown in Figs. 15 and 17 of the drawings. The forked portion 89a of the curved extension 89 extends on either side of the pivot 92 thereby to provide a rigid and foolproof construction.

Figure 18:
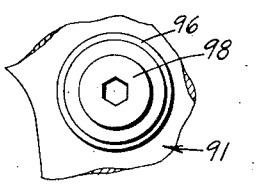
Fig. 18 is a fragmentary sectional view taken along line 18—18 of Fig. 15.

In order to provide some factory adjustment for initially setting the dehorner to produce the proper temperature when the lever 91c is in the solid line position shown in Fig. 11 of the drawings the segmental cam 91 is attached as indicated at 95 to a sleeve 96 mounted on the vertical stud or support 92. The inherent resilience of the lever 91c tends to bias the cam 91 and the associated sleeve 96 to the lowermost position. For adjustment purposes there is provided a setscrew 98 which may be operated by the conventional Allen wrench as best shown in Fig. 18 of the drawings. This setscrew 98 is threadably mounted to the sleeve 96 which is indicated as a split sleeve in the drawings. By adjusting the setscrew 98 as viewed in Fig. 9 of the drawings it will be apparent that the sleeve 96 may be moved in an upward direction as viewed in Fig. 9 with the resultant raising of the segmental cam 91 through engagement of the lower end of the setscrew 98 with the vertical stud 92. Downward movement of the segmental cam due to the inherent resilience of the segmental cam 91 including the lever 91c will cause movement in the opposite direction upon adjustment of the setscrew 98. Thus the thermostatic control unit may be adjusted at the factory to take care of minor discrepancies which are likely to occur in the manufacture of such thermal responsive control devices, thereby to insure that the desired temperature for the dehorning operation may be obtained when the lever 91c is moved into engagement with the notch 57b. A suitable opening 99 in the housing section 32 affording access to the setscrew 98 is provided.

To provide the desired strain relief for the power cord 80 the end of the housing section 30 remote from the housing section 32 is provided with a threaded opening 100 capable of receiving a suitable bushing 101. The bushing 101 is provided with a central opening and a shoulder 103 is defined therein to support the conventional flexible spring 104 for protecting the power cord 80 as it enters the housing 20. This conventional spring 104 is provided with one or more turns of enlarged diameter as designated at 104a to rest against the shoulder 103. To insulatingly support the conductors in passing through the bushing 101 which may be made of conducting material a tapered insulating bushing 105 is provided to fill the space around the power cord 80 and within a tapered opening 106 defined in the molded housing section 30. This tapered insert 105 may be formed of any suitable insulating material such as wood or the like. Actually member 105 is a sort of an insulating bushing having a central opening for the power cord 80. To provide for insulating the conductors 79 and 86 of the power cord 80 within the housing 30 and particularly in the insulating bushing 105 they are preferably provided with insulating sleeves 108 formed of insulation capable of withstanding heat. Strain relief is obtained by suitably taping the cord or otherwise providing an enlargement thereof within the enlarged turns 104a of the spring 104.

In accordance with a feature of the present invention, as mentioned above, the dehorner 19 may readily be converted to a heavy-duty soldering iron merely by attaching the soldering iron tip 28 to the dehorning ring 21. To this end the soldering iron tip 28 is provided with a tapered portion 112 which corresponds substantially to the tapered opening 22 in the dehorning ring 21, thereby assuring a suitable area of contact between the annular tapered surfaces comprising the surface defining the opening 22 and the tapered surface 112 on the soldering tip 28. For the purpose of supporting the soldering tip 28 in a readily releasable manner from the dehorning ring 21 it is provided with a threaded portion 113 engageable with an elongated nut or crosspiece 114 adapted to be disposed between the projections 21a and 21b so as to be prevented from turning while the soldering tip 28 is screwed into position. The soldering tip is preferably formed from copper in the conventional manner. With the above arrangement the soldering tip is held in position without in any way impairing dehorning ring 21.

In view of the detailed description included above, the operation of the dehorner device 19 readily convertible to a soldering iron will be understood by those skilled in the art. When it is desired to remove a horn bud or button from a young animal, the power cord 80 is connected to an external source of power in the conventional manner. Since under cold conditions the thermally controlled switch comprising contacts 73 and 74 is closed current flows to the sheathed heating element 50 which is rapidly heated. Since the instrument 19 is to be used at the higher temperature required for dehorning operations, the lever 91c is moved to the "D" position into notch 57b which causes contact 74 to assume the position shown in Fig. 11 of the drawings resulting in the thermal control device 26 maintaining the ring 21 at a high relatively constant temperature.

The handle forming portion 30 of the housing 20 is then manually grasped, and the dehorning ring 21 is applied over a horn button or bud 23 as shown in dotted outline in Fig. 4. The heat of the member 21 is applied to the hide of the animal for a distance around the circumference of the horn 23 which is greater than the searing surface 24 of the member 21. This heat is continuously applied for periods varying to and above ten seconds so that all of the horn producing cells are destroyed. The dehorning instrument is then removed from contact with the hide and horn 23 of the animal and may be applied to another horn button or bud. The instrument 19 is conditioned for immediate re-use inasmuch as the thermostatic control 26 maintains the instrument 19 at the desired predetermined high temperature. Since the ring 21 has a wide searing surface it gives more thorough heat than prior art devices and may be used successfully on older animals. Also since the ring 21 is open at both ends there is no practical limitation on the size of the horns to be removed. As a matter of fact it has been found that a successful dehorning job can be done on calves over four months old so long as the horns do not have a larger diameter than the opening 22.

When it is desired to utilize the instrument as a soldering iron, the soldering iron tip 28 is secured in position in the annular heating member 21 by rotating the tip 28 and threaded member 113 into engagement with the nut 114 until such time as the tapered portion 112 of the tip 28 is moved into intimate heat conducting engagement with the tapered aperture 22 formed in the member 21. The control lever 91c is then displaced along the slot 57 to be positioned within the notch 57a. This causes cam 91 to move contact 74 away from movable contacts 73 with the result that bimetallic element 70 opens the circuit at a lower temperature than when the lever 91c is in its "D" position.

From the above discussion it will be apparent that there has been provided an improved dehorning unit having numerous advantages over prior art devices as set forth above. Moreover this dehorning device can be used continuously with the temperature maintained at 1000° F. or thereabouts to insure complete and satisfactory dehorning in a humane and simple manner.

It is to be understood that the described embodiments are merely illustrative of the principles of this invention and that numerous other changes and modifications may be devised by those skilled in the art, and it is intended in the appended claims to cover all such changes and modifications as fall within the true spirit and scope of this invention.

What is claimed as new and desired to be secured by Letters Patent of the United States is:

1. A dehorning instrument comprising a housing, a somewhat toroidal-shaped metal member having a flat annular searing surface supported in spaced relationship with one end of said housing, temperature responsive means positioned within said housing for controlling the heating of said member, heat conducting means in engagement with both said member and said temperature responsive means for insuring that said temperature responsive means operates in response to the temperature of said member, and means for selectively adjusting said temperature responsive means to operate at two different temperature settings.

2. A dehorning instrument comprising a housing, a toroidal-shaped dehorning member having an integral projection, said member and projection being formed of a metal of high heat conductivity, means for mounting said member on said housing but spaced therefrom and with said projection extending into said housing, and thermal-responsive means positioned within said housing adjacent said projection and responsive to the temperature of said projection for controlling the heating of said member.

3. In a dehorner, a support having a longitudinal axis, a toroidal dehorning ring having a lateral projection secured to said support at a point displaced from said axis with said ring spaced from said support in a manner to receive a horn within the opening of said ring, the axis of said ring extending approximately parallel to the axis of said support, the size of said horn being limited only by the diameter of the opening in said ring and the spacing between said ring and said support, said ring being provided with an annular searing surface of substantial width on the face thereof remote from said support.

4. In combination with a support having a longitudinal axis, a thermal responsive control means mounted on said support, a toroidal member secured to and spaced from said support, an electrical heating element embedded in said toroidal member for heating said member, means for controlling the energization of said electrical heating element in response to said thermal responsive means, said member having an axis positioned approximately parallel to the axis of said support and being of annular configuration with a tapered aperture therethrough for receiving a bony appendage, said member also having an annular searing surface disposed adjacent the end of said aperture remote from said support.

5. In a dehorning instrument, the combination of a housing of generally elongated cylindrical configuration, an annular heating member concentric with said housing and secured thereto at a position spaced from one end of said housing, temperature responsive means positioned within said housing for controlling the heating of said member, and heat conductive means in good heat conductive relationship with both said member and said temperature responsive means.

6. A heating instrument comprising a housing having a first and a second housing section, one of said housing sections defining a handle for said instrument, a flat annular disk interposed edgewise between the first and second housing sections and secured thereto, said annular disk including a laterally extending projection disposed in spaced parallel relationship with one of said housing sections to support said heating instrument on any suitable support.

7. A dehorning instrument adapted for ready conversion to a soldering iron comprising supporting means, a toroidal dehorning member secured to said supporting means and spaced therefrom along the longitudinal axis thereof, the axis of said toroidal member extending substantially parallel to the longitudinal axis of said supporting means, said member also having a wide searing surface thereon at the side of said member remote from said supporting means, and said member having a tapered aperture therein opening outwardly in a direction away from said supporting means adapted to receive a cooperating tapering portion of a soldering iron tip in intimate heat transfer relationship.

8. A heating member for use in dehorning animals of the type having a bony appendage encircled by a ring of horn cells comprising, an electrical heating element of U-shaped configuration, a dehorning ring of somewhat toroidal configuration cast around a portion of the heating element, said dehorning ring having a flat searing surface on one side for engaging the ring of horn cells, said dehorning ring being formed with a tapered aperture therein adapted to receive said bony appendage, an elongated support, and means for mounting said ring with the longitudinal axis of said support extending through the central opening in said ring.

9. The heating member defined by claim 8 in which the dehorning ring comprises a pair of projections, one of said projections encircling a portion of the legs of said U-shaped heating element and the other projection being a solid member formed of good heat conducting material.

10. A heating instrument adapted to operate at one of a plurality of predetermined conditions comprising supporting means, heating means mounted at one end of the supporting means, circuit making and breaking means movably mounted on the supporting means for controlling the heating of the heating means, a thermal responsive means in engagement with the heating means for actuating the circuit means, cam means movably mounted on the supporting means and in engagement with circuit means, means for moving the cam means to vary the position of the circuit means relative to the actuating means so that the instrument is operated at a selected one of the plurality of conditions, and means for moving the cam means and moving means whereby the range of conditions to be selected is varied.

11. A dehorning instrument comprising a support, a somewhat toroidal-shaped member formed of a metal of high heat conductivity having a flat annular searing surface of substantial width, an electric heating element for heating said member, and means for rigidly mounting said member to said support with the longitudinal axis of sad support coinciding with the center of said toroidal member, said last mentioned means supporting said member with a substantial space between said member and said support.

12. A dehorning instrument comprising a support having a longitudinal axis, a toroidal metal member having a flat annular searing surface of substantial width secured to said support in spaced relationship therewith, an electric heating element embedded in said member, means for mounting said member to said support in spaced relationship thereto with the axis of the toroidal member disposed in parallel relationship with said longitudinal axis, the aperture in said toroidal member being tapered for receiving a bony appendage, said searing surface being disposed adjacent the large end of said aperture remote from said support.

13. A dehorning instrument comprising a support having a longitudinal axis, a toroidal metal member having a flat annular searing surface of substantial width secured to said support in spaced relationship therewith, an electric heating element imbedded in said member, means for mounting said member to said support in spaced relationship thereto with the axis of the toroidal member disposed in parallel relationship with said longitudinal axis, said mounting means including a portion displaced radially from said axis to permit a bony appendage to extend through said member toward said support, temperature responsive means positioned on said support, and heat conductive means disposed between said spaced toroidal member and said temperature responsive means, said heat conductive means also including a portion displaced radially from said axis.

References Cited in the file of this patent

UNITED STATES PATENTS

| | | |
|---|---|---|
| 1,956,016 | Flothow | Apr. 24, 1934 |
| 1,960,776 | Flothow | May 29, 1934 |
| 2,020,538 | Denison | Nov. 12, 1935 |
| 2,086,102 | Stradling | July 6, 1937 |
| 2,185,266 | Raffles | Jan. 2, 1940 |
| 2,257,376 | Grey | Sept. 30, 1941 |
| 2,288,464 | Kitchner | June 30, 1942 |
| 2,447,649 | Harrison | Aug. 24, 1948 |
| 2,488,477 | Rapaport | Nov. 15, 1949 |
| 2,498,328 | Atkins | Feb. 21, 1950 |
| 2,514,618 | Ancell | July 11, 1950 |
| 2,552,253 | Brown | May 8, 1951 |
| 2,554,926 | Schoenwald | May 29, 1951 |
| 2,569,250 | Mims | Sept. 25, 1951 |
| 2,582,481 | Ovorak et al. | Jan. 15, 1952 |

FOREIGN PATENTS

| | | |
|---|---|---|
| 70,928 | Norway | Sept. 2, 1946 |
| 473,343 | Canada | May 1, 1951 |
| 909,938 | France | Jan. 10, 1946 |